United States Patent [19]

Jackson et al.

[11] Patent Number: 5,107,577

[45] Date of Patent: Apr. 28, 1992

[54] TOOL MOUNTING FIXTURE

[76] Inventors: Donald T. Jackson, 1159 Ashley, Troy, Mich. 48098; Abid R. P. Ghuman, 1134 Charrington Rd., Birmingham, Mich. 48010; Joel D. Robinson, 6573 Noble Rd., West Bloomfield, Mich. 48322

[21] Appl. No.: 695,562

[22] Filed: May 3, 1991

[51] Int. Cl.⁵ .............................................. B25B 27/14
[52] U.S. Cl. ................................................. 29/281.4
[58] Field of Search ................ 29/281.1, 281.4, 771, 29/793, 794; 269/56, 58, 309, 310; 901/7; 414/736; 198/345

[56] References Cited

U.S. PATENT DOCUMENTS

| | | |
|---|---|---|
| 3,967,816 | 7/1976 | Ramsperger et al. |
| 4,298,195 | 11/1981 | McDougal |
| 4,489,500 | 12/1984 | Valat |
| 4,630,811 | 12/1986 | Rudisill |
| 4,675,969 | 6/1987 | Sciaky et al. |
| 4,711,437 | 12/1987 | Longenecker et al. |
| 4,731,936 | 3/1988 | Aldrich et al. |
| 4,757,607 | 7/1988 | Sciaky et al. |
| 4,757,608 | 7/1988 | Ochi |
| 4,802,800 | 2/1989 | Costin et al. |
| 4,968,012 | 11/1990 | Haddad et al. |

Primary Examiner—Robert C. Watson
Attorney, Agent, or Firm—Basile and Hanlon

[57] ABSTRACT

A tool mounting fixture includes a frame formed of a plurality of parallel, elongated tubular members interconnected by a plurality of bases arranged in a predetermined geometric pattern and connected to adjacent ones of the tubular members. The bases include slots for receiving one end of one of first and second support members positionable over the frame. The second ends of the first and second support members are positionable in an overlaying relationship at a predetermined X-Y coordinate with respect to the frame and secured together by a fastener. A workpiece engaging member is mounted on the second end of the second support member for releasably engaging a workpiece spaced above the frame. Cam operated lifters may be employed with certain workpiece engaging members to raise the workpiece engaging members into engagement with the workpiece.

16 Claims, 5 Drawing Sheets

TOOL MOUNTING FIXTURE

BACKGROUND OF THE INVENTION

1. Field of the Invention

The present invention relates, in general, to fixtures for mounting tools used in locating, holding and assembling workpieces and, specifically, to fixtures for mounting tools used to assemble vehicles in production lines.

2. State of the Art

In modern automotive assembly operations, the major components of a vehicle body, such as the under body, side frames, and roof are initially tack welded together in a special fixture to insure dimensional accuracy. The partially assembled body is then conveyed by suitable means, such as ground or overhead conveyor, special purpose platform or framing buck, etc., to a respot or finish weld area where automatic welders, programmable robots, etc., make multiple welds and/or install additional panels and support members to the body. Such respot operations typically require multiple, successively arranged welding tools or robots to add the substantial number of welds needed to insure the structural integrity of the vehicle body.

In each individual weld station, the automatic tooling or robot must first accurately locate the body with respect to a known reference point before beginning the welding operation. Locating pins at each weld station are employed to engage reference apertures or "read holes" in the vehicle. In certain vehicle assembly operations, a lifter is located at each weld station to raise the locating pins into engagement with the "read holes" in the vehicle body and to lift the vehicle body off of the conveyor to a set working height for subsequent respot welding operations.

However, for efficient utilization of plant and tool resources, it is common for several different vehicle models or styles to be assembled on the same production line. Due to part geometry, each different vehicle model may require different tooling which, of necessity, is often located at different X and Y coordinates in each weld station. Due to the complexity of modern vehicles, completely separate, dedicated respot stations are often required for each different vehicle style. This increases tooling costs due to the need for separate welding equipment, robots, etc., as well as increasing plant floor usage requirements.

Additional increases in tooling costs are incurred during model changeover in which the tooling dedicated to a particular vehicle model or style is often discarded in favor of new tooling for a new model or for minor changes in the old model. In an attempt to reduce overall tooling costs, it is known to provide modular workpiece fixtures which include a plurality of apertures arranged in an X-Y grid pattern, such as that disclosed in U.S. Pat. No. 4,968,012. Tooling dedicated to a particular vehicle style or model is mounted on the modular frame in predetermined positions at desired X and Y coordinates. During model change or the revision of vehicle styles on a particular production line, the tooling can be repositioned on the modular fixture as needed, with only the portion of the tooling which contacts the vehicle body being revised for specific new features or vehicle models.

However, such modular tooling requires large surface plates with a substantial number of X-Y grid arranged apertures to provide the desired tooling repositioning capability. Such plates are heavy and require extensive precision machining for the X-Y grid arranged apertures thereby resulting in a high manufacturing cost.

It would be desirable to provide a tool mounting fixture particularly suited for vehicle assembly operations which substantially reduces tooling costs compared to previously devised tool mounting fixtures. It would also be desirable to provide a tool mounting fixture which is light in weight and has minimal precision machining requirements. It would also be desirable to provide a tool mounting fixture in which the tooling can be easily repositioned as necessary for different workpieces. Finally, it would be desirable to provide a tool mounting fixture utilizing many standard tooling components which require a minimal amount of replacement during changeover or the introduction of new models on a particular vehicle production line.

SUMMARY OF THE INVENTION

The present invention is a tool mounting fixture for repositionably mounting tools which engage a workpiece during a manufacturing operation.

The tool mounting fixture includes a frame formed of a plurality of elongated, spaced, planar tubular members. A plurality of bases are fixedly secured between adjacent ones of the tubular members of the frame and arranged in a predetermined geometric pattern over the frame.

Each of the bases includes a plate which is disposed on top of and spans two adjacent tubular members of the frame. At least one slot extends through the plate. Preferably, however, a plurality of perpendicularly oriented slots are formed in each base plate. A support structure is formed on the base and is connected to one surface of the plate. The support structure is disposed between the two adjacent tubular members of the frame. Certain portions of the plate and the support structure are fixedly connected to the tubular members to rigidly interconnect the tubular members of the frame into a unitary structure.

A first support member having first and second ends is repositionably mounted on the frame. The second end of the first support member is formed in a pad-like shape which is disposed in contact with the frame. A second support member also has first and second ends. The second end of the second support member has a pad-like shape positionable so as to overlay the second end of the first support member.

First fastener means, mounted in one of the slots of two different bases, fixedly connect the first ends of the first and second support members to the two bases, respectively, to position the overlaying second ends of the first and second support members at predetermined X and Y coordinates with respect to the frame. A second fastener means is provided for fixedly interconnecting the second ends of the first and second support members together. Workpiece engaging means is mounted on the second end of the second support member for engaging a workpiece spaced above the frame.

In a preferred embodiment, the first fastener means comprises a slider member having a portion slidably disposed in one of the slots of a base. A fastener, such as a shoulder screw, extends through the first end of the first or second support members to engage the slider and fixedly connect the first end of the first or second support members to one of the bases.

Clamp means are mounted on the second end of the second support member for releasably receiving and attaching the workpiece engaging means to the second support member.

In an alternate embodiment, lifter means are mounted on the second end of the second support member for raising and lowering a workpiece engaging tool or member into and out of engagement with a workpiece spaced above the frame. In a preferred embodiment, the lifter means comprises a cam operated lift unit which reciprocally extends and retracts an elongated tubular rod. The cams are formed in opposed, inverted positions in at least two arms pivotally interconnected at one end. A fluid operated cylinder drives a piston rod carrying cam followers at an outer end which engage the cams and pivot the arms in a scissor-like movement to extend and retract the tubular rod.

The workpiece engaging member may be a locator pin attached to the upper end of the rod which engages a reference aperture or "read hole" in a workpiece, such as a vehicle body. Alternately, a clamp unit may be mounted on the top end of a lifter rod to aid in raising the workpiece from a conveyor or material handling means as well as clamping the workpiece in a fixed position for subsequent manufacturing operations.

In a preferred embodiment, the clamp unit is cam operated and is formed substantially similar to the cam operated lift unit of the present invention. A fluid cylinder drives a piston rod carrying cam followers which slidably engage cams formed in pivotal arms. Opposed clamp members are attached to the exterior end of the arms for movement between open and workpiece engaging positions.

The tool mounting fixture of the present invention provides a frame and mounting base for workpiece engaging tools which is both light in weight and low in manufacturing costs. The fixture does not require extensive precision machining to form an X-Y grid arrangement of mounting holes for receiving various tool fixtures as common in previously devised tool mounting fixtures. By use of the present tool mounting fixture, workpiece engaging tools, such as locators, clamps, etc., can be precisely located at predetermined X and Y grid coordinates with respect to the frame in a simple and expeditious manner. Further, multiple workpiece engaging tools may be mounted on a single frame at different locations so as to enable a single frame to accommodate several different workpieces, i.e., styles of vehicle bodies. When the present invention is employed in vehicle assembly operations, its use substantially reduces the number of separate weld or assembly stations and associated welding or assembly tools compared to previous arrangements so as to reduce overall tooling costs and minimize floor space requirements.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
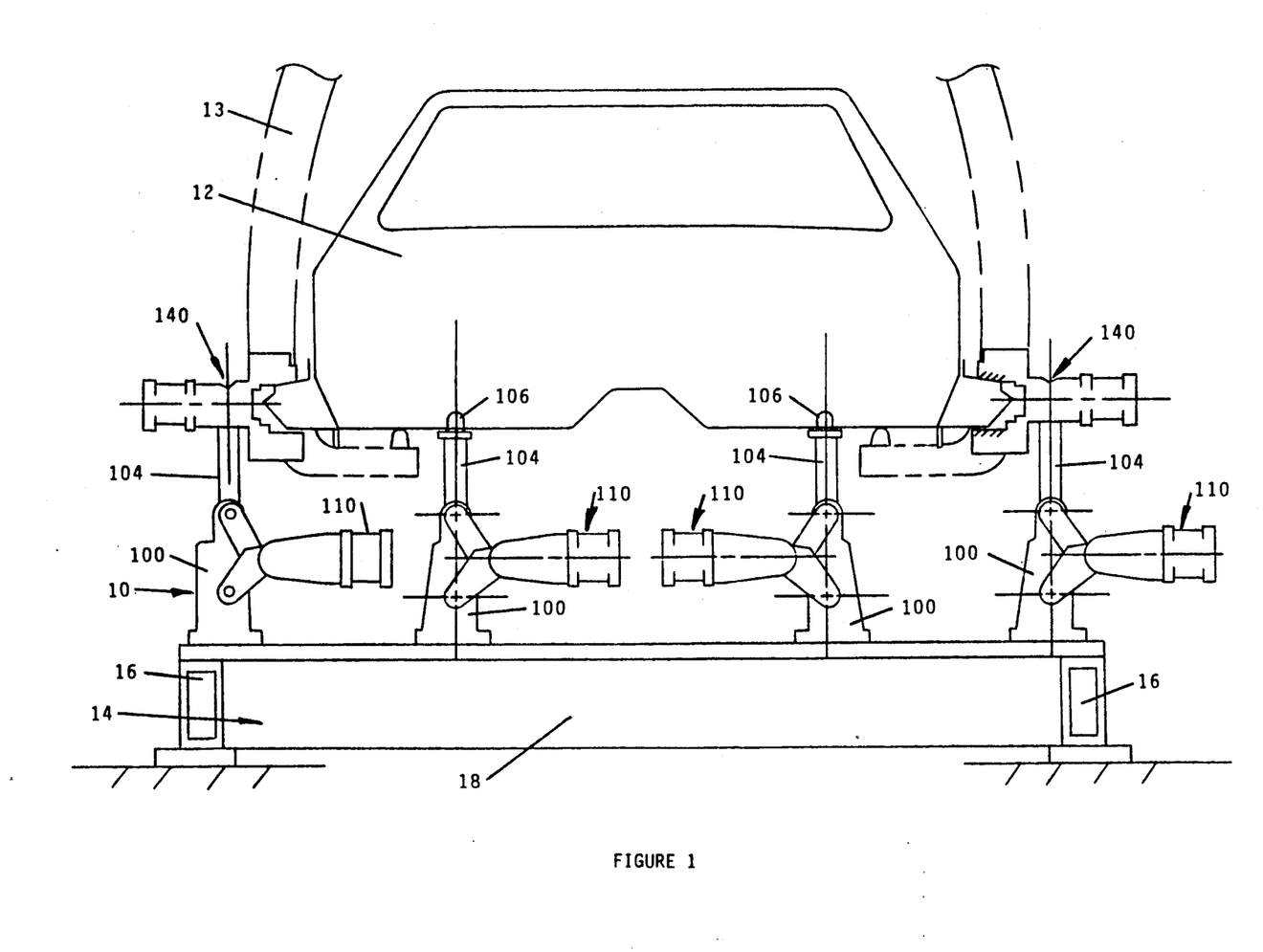
FIG. 1 is a front elevational view of the tool mounting fixture of the present invention shown in use in a vehicle assembly operation.

Referring now to the drawing, and to FIG. 1 in particular, there is illustrated a tool mounting fixture 10 which provides a base for mounting various tools in a predetermined, precise X-Y grid arrangement to perform manufacturing operations on a workpiece. In the following example, the term workpiece 12 is applied to a vehicle, such as an automobile body. It will be understood, however, that the tool mounting fixture 10 of the present invention may be employed in other manufacturing operations to perform work on other types of workpieces.

By way of background, the vehicle body 10, which has been partially tack welded in previous stations, is conveyed by a material handling means or conveyor 13 to a work station in which the tool mounting fixture 10 is located.

Figure 2:
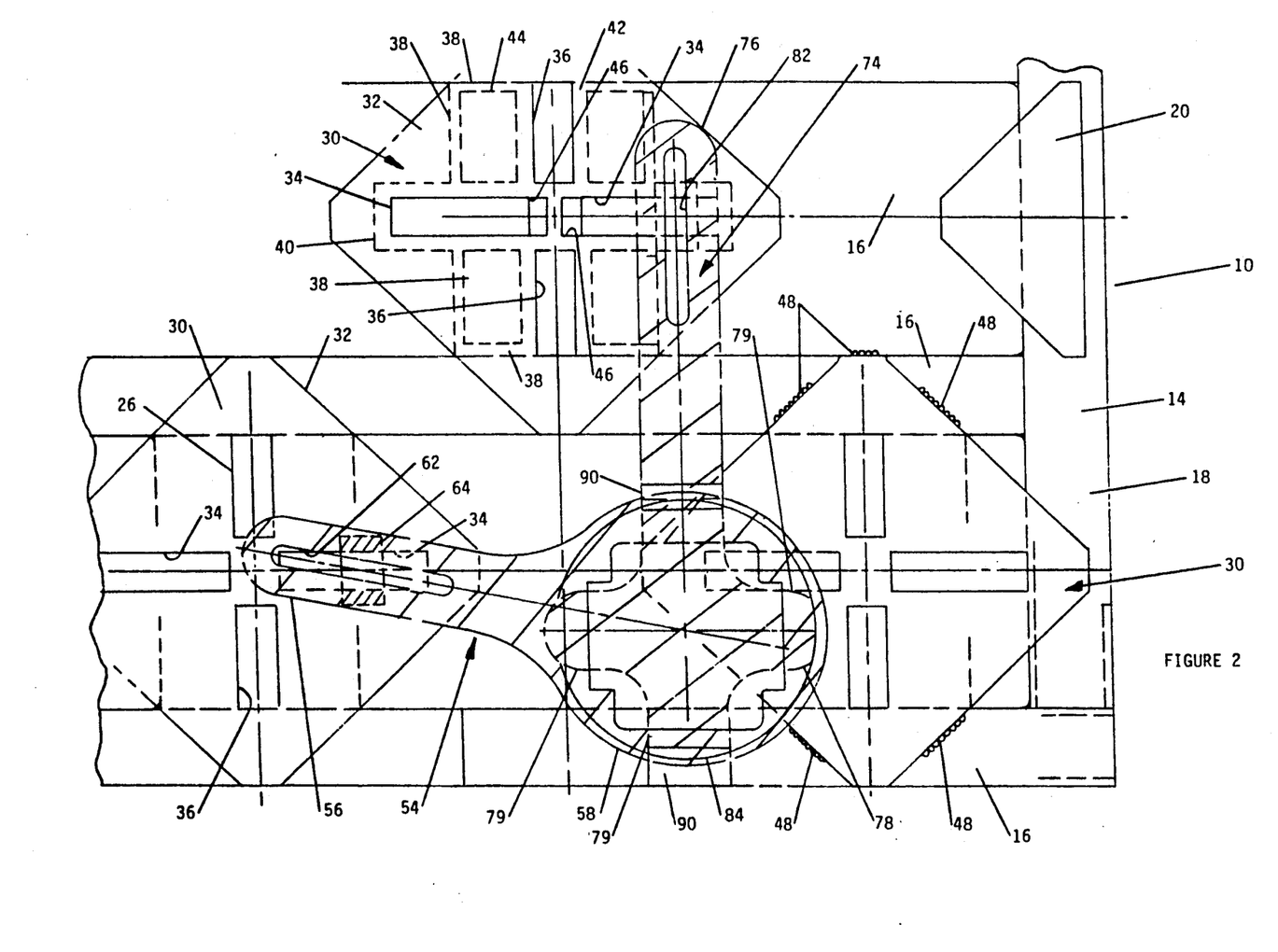
FIG. 2 is an enlarged, partial, plan view of the tool mounting fixture shown in FIG. 1.
Figure 3:
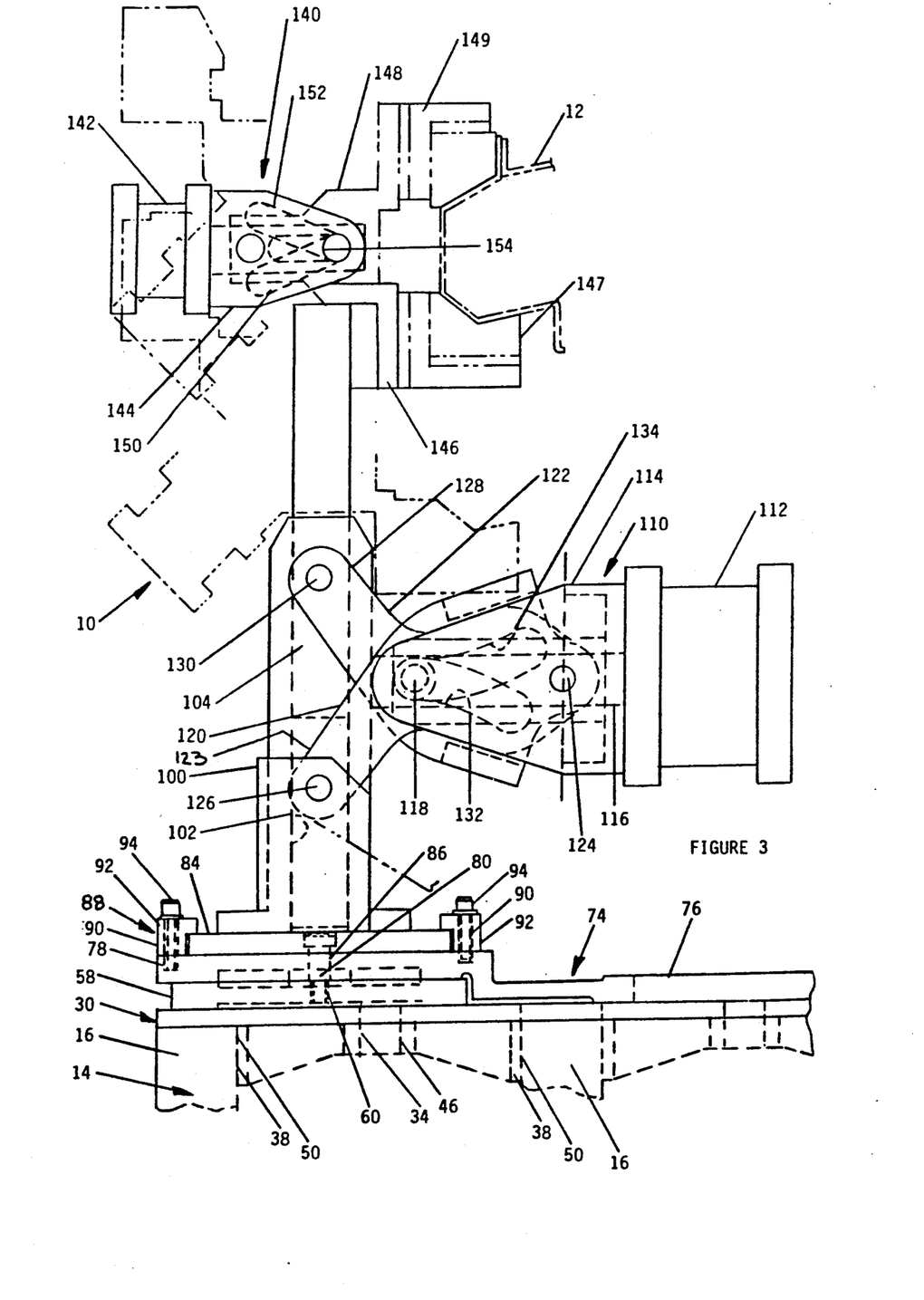
FIG. 3 is a side elevational view of the portion of the tool mounting fixture shown in FIG. 2.

In a preferred embodiment, as shown in FIG. 1, and in detail in FIGS. 2 and 3, the tool mounting fixture 10 includes a frame denoted in generally by reference number 14. The frame 14 may have any shape and size to suit the needs of a particular application. The frame 14 is formed of a plurality of elongated, spaced, tubular members 16 which are arranged in parallel along the length of the frame 14. In a preferred embodiment, the tubular members 16 are formed of hollow steel members for a light overall weight. A pair of opposed tubular members 18, one of which is shown in FIG. 2, are disposed along and connected to opposite ends of substantially all of the tubular members 16 to form a rigid structure.

By way of example only, the frame 14 may have a ten-foot length and a six-foot width. The tubular members 16 may comprise elongated, hollow members two inches in width and four to six inches in height. It will be understood that other sized components may also be employed to form the frame 14.

As shown in FIG. 2, a plurality of additional, substantially triangular-shaped support members 20 are mounted on the tubular members 18 and extend inward a short distance so as to overlay and cover a portion of the opening between two adjacent tubular members 16. The purpose of the support members 20 will become more apparent hereafter.

The tool mounting fixture 10 includes a plurality of bases denoted in general by reference number 30. The bases 30 are identically constructed and are spaced in a predetermined geometric pattern across the entire surface area of the frame 14. Each of the bases 30 spans and is connected to two adjacent tubular members 16 as shown in FIG. 2. The bases 30 which are arranged in a row along the length of two adjacent tubular members 16, are offset from the bases 30 in adjacent tubular members 16 to form the desired geometric pattern shown in FIG. 2. By way of example only, the bases 30 are spaced apart on 15-inch centers.

Each of the bases 30 includes an upper plate 32 which in a preferred embodiment has a generally diamond shape. At least one and preferably a plurality of slots are formed in and extend through the plate 32 in each of the bases 30. In a preferred embodiment, two pairs of perpendicularly oriented slots 34 and 36, are formed in each of the plates 32.

As shown in FIGS. 2 and 3, a support structure is formed on each base 30. The support structure is formed of a plurality of ribs 38 which are interconnected between adjacent, perpendicular solid support sections 40 and 42 to form a unitary structure. Open areas 44 are formed between the ribs 38 and the adjacent solid support sections 40 and 42 for weight reduction purposes. Slots 46 are formed in the solid support sections 40 and 42 and are aligned with the pairs of slots 34 and 36 formed in the base plate 32.

The base 30 including the base plate 32 and support structure may be formed of discrete components which are interconnected by suitable means, such as by welding. Alternately, and in a preferred embodiment, the entire base 30 is formed as a single, unitary casting.

Each base 30 is connected to and spans two adjacent tubular members 16 as shown in FIGS. 2 and 3. The joints 48 between the edges of the base plate 32 and the top surface of the tubular members 16 are connected to the tubular members 16 by welds. In addition, the juncture between the ribs 38 of the base support structure are also welded to the depending portions of the tubular members 16 at locations shown by reference number 50 in FIG. 3. This interconnects the bases 30 and the tubular members 16 into a rigid, unitary structure. At the same time, the frame 14 includes a substantial amount of open areas thereby achieving an X-Y grid mounting arrangement with a minimal weight and a low manufacturing cost.

Figure 4:
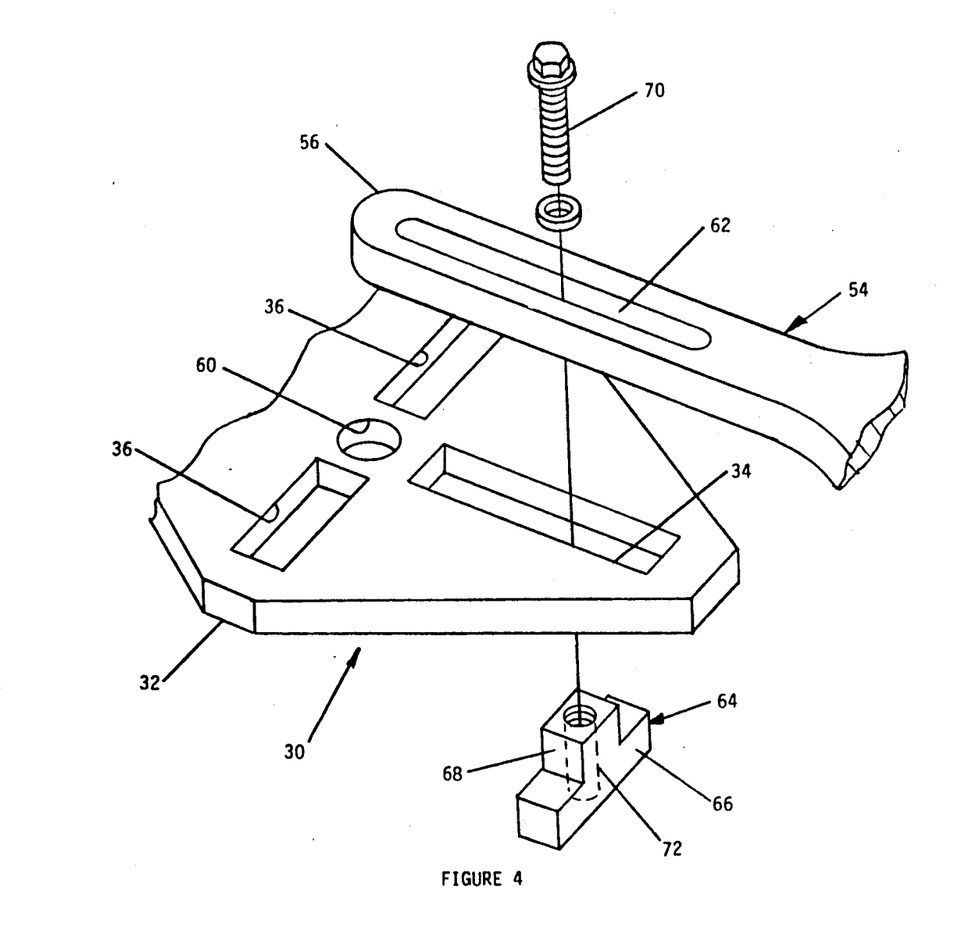
FIG. 4 is a partial, exploded view showing a portion of the tool mounting fixture depicted in FIG. 2.

A first support member 54 is associated with one of the bases 30. As shown in FIGS. 2 and 4, the first support member 54 is in the form of an elongated planar arm having a first end 56 and a second, opposed end 58. The second end 58 of the first support member 54 has a generally circular, pad-like shape which overlays and is disposed in contact with one of the bases 30 and/or one of the tubular members 16. The additional support member 20 attached to the endmost tubular members 18 of the frame 14 provides a surface for supporting the second end 58 of a first support member 54 located near the end of the frame 14. A central aperture 60 is formed in the second pad-like end 58 of the first support member 54 for purposes which will be described in greater detail hereafter.

The first end 56 of the first support member 54 includes an elongated slot 62. The slot 62 is adapted to overlay one of the slots 34 or 36 in one of the bases 30, such as is depicted in FIG. 2. A first fastening means is provided for fixedly connecting the first end 56 of the first support member 54 to one of the bases 30. The first fastening means includes a slider 64, as shown in FIG. 4. The slider 64 has a generally T-shape formed of an elongated head 66 and a smaller, depending leg 68. The width of the slider 64 is selected so as to enable the leg 68 of the slider 64 to be slidably disposed within one of the slots 34 or 36 in a base plate 32 and the slot 62 in the first end 56 of the first support member 54. However, the slider 64 may be rotated after insertion through the slot 62 in the first support member 54 and one of the slots 34 and 46 in one of the bases 30 so as to enable the outwardly extending ends of the head portion 66 of the slider 64 to engage the bottom surface of the base 30. A fastener 70, such as a shoulder screw, extends through the aligned slots 62, 34 or 36 in the first support member 54 and the base 30 into a threaded bore 72 formed in the slider to fixedly connect the sider 64, the base 30, and the first end 56 of the first support member 54 together.

A second support member 74 is paired with each of the first support members 54 as shown in FIGS. 2 and 3. The second support member 74 has a first end 76 and an opposed second end 78. A central aperture 80 is formed in the second end 78 of the second support member 74 and is selectively alignable with the aperture 60 in the second end 58 of the first support member 54.

As shown in FIG. 3, the second support member 74 has the second end 78 which is raised above the first end 76 so as to enable the second end 78 of the second support member 74 to overlay and be disposed in registry with the second end 58 of the associated first support members 54. By way of example only, the second end 78 of each second support member 74 has a pad-like shape in the form of a plurality of radially extending fingers 79.

The first end 76 of the second support member 74 includes an elongated slot 82 which overlays one of the slots 34 or 36 in one of the bases 30. The slot 82 receives a fastener, such as the fastener 70 shown in FIG. 4, which interconnects the first end 76 of the second support member 74 to the one base 30 when it engages an associated slider 64, slidably mounted in one of the slots 34 or 36 in the base 30 as described above.

In one embodiment, a second fastener means may be disposed through the aligned apertures 60 and 80 in the second ends 58 and 78 of the first and second support members 54 and 74, respectively, to interconnect the second ends 58 and 78 together at a precise, X-Y coordinate with respect to the frame 14. The opposed first ends 56 and 76 of the first and second support member 54 and 74, respectively, are then fixed in position on two separate bases 30 by tightening the first fastener 70 into the associated slider 64. This fixes the first and second support member 54 and 74 in a rigid position at a predetermined X-Y grid coordinate on the frame 14.

Workpiece engaging means, such as a locator pin, clamp, or other manufacturing tool or equipment; is mounted on the upper surface of the second end 78 of the second support member 74 as shown in FIGS. 1 and 3. The workpiece engaging means includes a mounting ring 84 which preferably, and by way of example only, has a circular shape. The second fastener means 86 may be secured through a central aperture in the mounting ring 84 to fixedly interconnect the mounting ring 84 with the second ends 58 and 78 of the first and second support members 54 and 74, as described above.

The mounting ring 84 may be releasably attached to the second end 78 of the second support member 74 by clamp means shown in general by reference number 88 in FIG. 3. The clamp means 88 preferably comprises a pair of spaced, clamp members 90 which have an outwardly extending, upper flange 92 which overlays and engages the upper surface of the mounting ring 84. Suitable fasteners 94 are employed to removably mount each of the clamp members 90 to the second end 78 of the second support member 74.

Various workpiece engaging members or tools may be releasably mounted to the mounting ring 84 by means of fasteners. In a preferred embodiment shown in detail in FIG. 3, a riser 100 is releasably attached to the mounting ring 84 by mounting screws, not shown. The riser 100 is in the form of a housing having a centrally located, elongated, internal bore 102. An extensible and retractable rod 104 is slidably mounted in the bore 102 of the riser 100.

A variety of different workpiece engaging members may be mounted on the upper end of the rod 104. As shown in FIG. 1, a locator pin 106 which releasably engages a reference aperture, such as the so-called "read hole", in a vehicle body 12 may be fixed, such as by welding, to the end of the rod 104. Alternately, as shown in FIG. 1, and in greater detail in FIG. 3, a clamp means 140 may be mounted on the upper end of the rod 104 for releasably clamping the vehicle body 12 in a fixed position with respect to the frame 14 of the tool mounting fixture 10.

Figure 5:
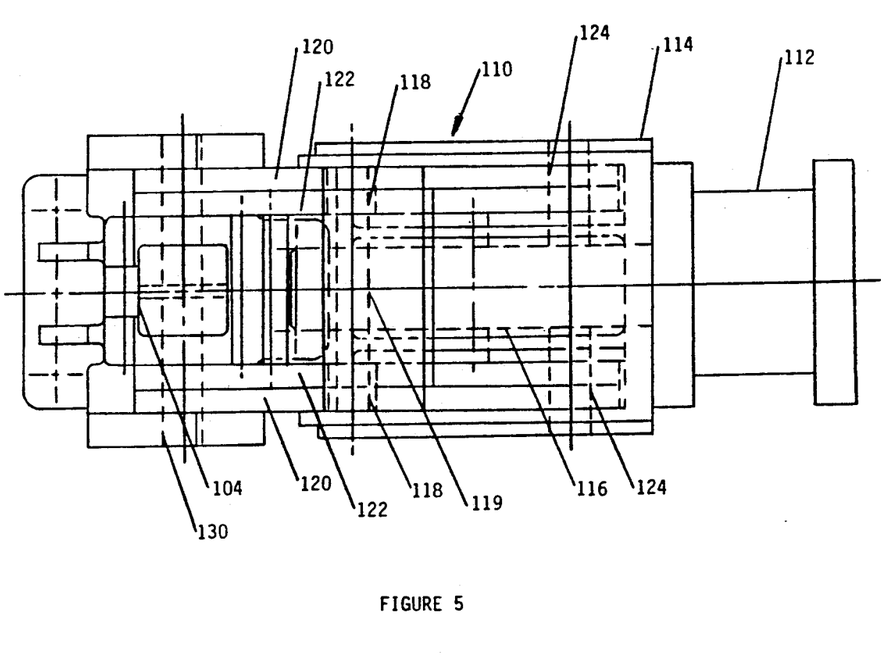
FIG. 5 is a plan view of the cam operated lifter employed in the tool mounting fixture of the present invention.

In a preferred embodiment, lifter means are associated with the workpiece engaging means and is movable between raised and lowered positions. In the raised position, the lifter means urges a workpiece engaging tool, such as the locator pin 106 or the clamp means 140 into engagement with the vehicle body 12 and, at the same time, raises the vehicle body 12 off of the supporting portions of the conveyor 14 to a known, working height above the frame 14. Although any suitable lifter means, such as a fluid operated cylinder, may be employed, a preferred embodiment of the present invention employs a cam operated lock lifter means 110 shown in detail in FIGS. 3 and 5. The cam operated lock lifter means 110 includes a fluid operated cylinder 112 which is connected to a support body 114. The cylinder 112 includes a piston which reciprocally moves a piston rod 116 between extensible and retractable positions through the support body 114. Cam followers 118, preferably in the form of rollers, are mounted on a cross pin 119 extending transversely through the outer end of the piston rod 116. Two pairs of pivotal arms 120 and 122 are pivotally connected at a first end via pins 124 to the support body 114. The pivotal arms 120 and 122 are arranged in an outer pair of arms 122 and an inner pair of arms 120. Each of the arms in each pair of arms 120 and 122 is substantially identically constructed. The outer pair of arms 120 has a second end 124 pivotally connected via stub pins 126 to the upper end of the riser housing 100. The second ends 128 of the inner pivotal arms 122 are pivotally connected to a cross pin 130 which extends through the arms 122 and the upper end of the reciprocal rod 104.

A cam is formed in each of the arms 120 and 122. The cams are identical, except that the cams 132 in the arms 120 are inverted in orientation from the cams 134 in the arms 122. Each of the cams 132 and 134 has a generally elongated, linear portion which terminates in an angular end portion as shown in FIG. 3. The angular end portion forms a positive lock to retain the arms 120 and 122 in a fixed position even if fluid power to the cylinder 112 is cut off. Further details concerning the operation and construction of the cam lock lift means 110 may be had by referring to co-pending application Ser. No. 07/506,671, filed Apr. 9, 1990, the contents of which are incorporated herein by reference.

In operation, when the cylinder 112 is actuated to move the piston rod 116 outward to its fully extended position, the piston rod 116 will drive the cross pin 119 and the cam rollers 118 along the cams 132 and 134 which causes the second ends 124 and 128 of the pairs of arms 120 and 122, respectively, to pivot apart to the position shown in FIG. 3 to raise the reciprocal rod 104 in the riser 100 to its extended, raised position. Retraction of the piston rod 116 will reverse this operation and cause a scissor-like movement of the arms 120 and 122 to lower the rod 104 into the riser housing 100.

A preferred embodiment of the clamp means which is useable with the tool mounting fixture 10 of the present invention is shown in FIG. 1, and in greater detail in FIG. 3. The clamp means 140 employs a similar cam operated mechanism as that described above and illustrated for the cam lock lifter 110. Thus, the clamp means 140 employs a fluid operated cylinder 142, a support body 144, opposed pairs of pivotal arms 146 and 148, inverted cams 150 and 152 in the arms 146 and 148, respectively, which receive cam followers shown in general by reference number 154 mounted on the ends of a cross pin connected to the cylinder piston rod. The operation of the clamp 140 is similar to that described above for the lifter 110 in that activation of the cylinder 142 causes a pivotal movement of the arms 146 and 148 between closed and open positions. In the closed position shown in FIG. 3, the lowermost clamp member 147 connected across the pair of arms 146 engages a bottom portion of the workpiece or vehicle 12 and raises the vehicle 12 off the conveyor 14 as the clamp 140 is raised by the lifter 110. The upper clamp member 149 connected across the pair of arms 148 engages an opposed surface of the vehicle body 12 to clamp the vehicle body 12 in a fixed position relative to the frame 14.

Reverse operation of the cylinder 142 causes the arms 146 and 148 to pivot to an open position shown in phantom in FIG. 3 to release the clamp members 147 and 149 from engagement with the body 12.

Referring again to FIG. 1, it will be understood that a plurality of individual workpiece engaging means may be mounted on the tool mounting fixture 10 at different X-Y coordinates via separate first and second support members 54 and 74. As shown in FIG. 1, two locator pins 106 reciprocally driven by cam lock lifters 110, as described above, releasably engage reference apertures or "read holes" in a workpiece, such as a vehicle body 12. A plurality, with only two being shown, additional lifter means 110 reciprocally move clamp means 140 between raised and lowered positions. During the raising operation, the lifter means 110 causes the lowermost portion of each of the clamp means 140 to engage the vehicle or workpiece 12 and raise the workpiece 12 from the conveyor or material handling mechanism 13. It will be understood that additional lifters and clamp means may be employed along the length of the workpiece or vehicle body 12 as is necessary to securely clamp and hold the vehicle body 12 in a fixed position relative to the tool mounting fixture 10.

It will be further understood that locator pins and clamp members associated with different workpieces, such as different vehicle body styles, may also be mounted on the tool mounting fixture 10 at distinct X-Y grid coordinates and held in their lowered, retracted positions so as to be usable only with a particular workpiece.

What is claimed is:

1. A tool mounting fixture comprising:
   a frame, the frame being formed of a plurality of elongated, spaced, parallel, tubular members;
   a plurality of bases fixedly secured between adjacent ones of the tubular members of the frame and arranged in a predetermined geometric pattern, each base including:
   a plate disposed on top of and spanning two adjacent tubular members of the frame;
   at least one slot formed in and extending through the plate; and a support structure connected to one surface of the plate and disposed between two adjacent tubular members of the frame, portions of the plate and the support structure being fixedly connected to the tubular members to rigidly interconnect the tubular members and the bases into a unitary structure;

a first support member having first and second ends, the second end of the first support member being positionable over the frame;

a second support member having first and second ends, the second end of the second support member being positionable so as to overlay the second end of the first support member;

first fastener means, mounted in the slots of two different bases, for fixedly connecting the first ends of the first and second support members to the two bases, respectively;

second fastener means for fixedly interconnecting the overlaying second ends of the first and second support members at a predetermined X-Y grid coordinate with respect to the frame; and workpiece engaging means, mounted on the second end of the second support member, for engaging a workpiece spaced from the frame.

2. The tool mounting fixture of claim 1 wherein the workpiece engaging means is releasably mounted on the second end of the second support member.

3. The tool mounting fixture of claim 2 further including:

clamp means, mounted on the second end of the second support member, for releasably clamping the workpiece engaging means to the second support member.

4. The tool mounting fixture of claim 1 wherein the workpiece engaging means comprises:

a workpiece engaging member; and lifter means for raising and lowering the workpiece engaging member with respect to the frame into and out of engagement with the workpiece.

5. The tool mounting fixture of claim 1 wherein the first fastener means comprises:

a slider slidably mounted in the slot of one of the bases; and a fastener extending through one end of one of the first and second support members and the slider to fixedly connect the first end of the one of the first and second support members and the slider to the base.

6. The tool mounting fixture of claim 5 wherein:

the slider has a T-shaped cross section with an enlarged head and a depending leg, the leg being slidably disposed in the slot in one of the bases.

7. The tool mounting fixture of claim 1 wherein the first support member comprises:

a slot formed in the first end for receiving the first fastener means therethrough;

an elongated arm extending between the first and second ends; and an aperture formed in the second end for receiving the second fastener means therethrough.

8. The tool mounting fixture of claim 1 wherein the second support member comprises:

an elongated arm extending between the first and second ends; and an aperture formed in the second end of the first support member for receiving the second fastener means therethrough.

9. The tool mounting fixture of claim 1 wherein the workpiece engaging means further includes clamp means, movable between open and closed positions, for clamping the workpieces in a fixed position relative to the frame.

10. The tool mounting fixture of claim 9 further including:

lifter means, mounted on the second end of the second support member, and having the clamping means mounted thereof, for raising and lowering the lamp means relative to the frame.

11. The tool mounting fixture of claim 1 further including:

a plurality of first and second support members fixedly interconnected at the second ends at distinct X-Y grid coordinates with respect to the frame and each fixedly connected at the first ends to one of the bases.

12. The tool mounting fixture of claim 1 further including:

a pair of slots extending through the plate of each base, the slots being oriented perpendicular to each other on each plate.

13. The tool mounting fixture of claim 12 wherein each pair of slots comprises:

two spaced, co-linear slots.

14. The tool mounting fixture of claim 1 wherein the second ends of the first and second support members have a planar pad-like shape.

15. The tool mounting fixture of claim 4 wherein the lifter means comprises:

a housing mountable on the second end of the second support member;

a rod reciprocally mounted in the housing and movable between extended and retracted positions with respect to the housing;

a fluid operated cylinder having an extensible and retractable piston rod mounted therein and extending outward from the cylinder;

a support body mounted on the cylinder, the piston rod reciprocally extending through the body;

cam follower means mounted on and movable with the cylinder rod;

first and second arms, each having first and second ends, the first and second arms being disposed in opposed, inverted position with respect to each other and pivotally connected at the first ends to the support body, the second end of the first arm being pivotally connected to the rod housing, the second end of the second arm being pivotally connected to the rod mounted in the housing;

identical cam means formed in each of the first and second arms and disposed in opposed, inverted relationship with respect to the cam means formed in the opposed one of the first and second arms, each of the cam means having a first linear portion and a second portion contiguous with and angularly extending from the first linear portion; and the cam follower means engaging the cam means in the first and second arms during linear reciprocal movement of the piston rod to move the first and second arms between a first, spaced-apart position to extend the rod from the housing when the piston rod is extended to a second position when the cylinder rod is retracted to retract the rod into the housing.

16. A tool mounting fixture comprising:

a frame, the frame being formed of a plurality of elongated, spaced, parallel, tubular members;

a plurality of bases fixedly secured between adjacent ones of the tubular members of the frame and arranged in a predetermined geometric pattern, each base including:
- a plate disposed on top of and spanning two adjacent tubular members of the frame;
- a pair of perpendicularly arranged slots formed in and extending through the plate; and
- a support structure connected to one surface of the plate and disposed between two adjacent tubular members of the frame, portions of the plate and the support structure being fixedly connected to the tubular members to rigidly interconnect the tubular members and the bases into a unitary structure;

a first support member having first and second ends, the second end of the first support member being positionable over the frame;

a second support member having first and second ends, the second end of the second support member being positionable so as to overlay the second end of the first support member;

first fastener means, mounted in the slots of two different bases, for fixedly connecting the first ends of the first and second support members to the two bases, respectively, each of the first fastener means including a slider having a T-shaped cross section with an enlarged head and a central depending leg, the leg being slidably disposed in one of the slots of one of the plates, a fastener extending through one end of one of the first and second support members into the slider to fixedly connect the first end of the one of the first and second support members and the slider to the base;

second fastener means for fixedly interconnecting the overlaying second ends of the first and second support members at a predetermined X-Y grid coordinate with respect to the frame; and workpiece engaging means, mounted on the second end of the second support member, for engaging a workpiece spaced from the frame.

* * * * *